(12) United States Patent
Mumm et al.

(10) Patent No.: US 8,162,546 B1
(45) Date of Patent: Apr. 24, 2012

(54) FIBER OPTIC CABLE CONFIGURED FOR INDOOR AND OUTDOOR DEPLOYMENT

(75) Inventors: Jeffrey H. Mumm, Marietta, GA (US); Jeffrey S. Laws, Brownwood, TX (US); George Bell, New York, NY (US)

(73) Assignee: Superior Essex Communications, LP, Atlanta, GA (US)

( * ) Notice: Subject to any disclaimer, the term of this patent is extended or adjusted under 35 U.S.C. 154(b) by 339 days.

(21) Appl. No.: 12/384,103

(22) Filed: Mar. 31, 2009
(Under 37 CFR 1.47)

Related U.S. Application Data

(60) Provisional application No. 61/072,611, filed on Apr. 1, 2008.

(51) Int. Cl.
 *G02B 6/00* (2006.01)
 *G02B 6/36* (2006.01)

(52) U.S. Cl. .......................................... 385/76; 385/147

(58) Field of Classification Search .................... 385/76, 385/100, 129–130, 147, 109–113
See application file for complete search history.

(56) References Cited

U.S. PATENT DOCUMENTS

| 6,178,278 B1 * | 1/2001 | Keller et al. ............... 385/109 |
| 6,640,033 B2 * | 10/2003 | Auvray et al. ............. 385/109 |
| 2011/0134635 A1 * | 6/2011 | Feldman et al. ........... 362/234 |

* cited by examiner

*Primary Examiner* — Akm Ullah
(74) *Attorney, Agent, or Firm* — King & Spalding

(57) ABSTRACT

A connectorized fiber optic communications cable can comprise a section rated for indoor service and a section rated for outdoor service. A continuous optical fiber can extend through the indoor-rated section and the outdoor-rated section, for example from an outdoor-rated connector on the outdoor-rated section to an indoor-rated connector on the indoor-rated section. The cable can be installed via feeding the section rated for indoor service through a hole in a building, such as a home, to a communication or computing device within the building. The section rated for outdoor service can be buried underground and extended to another communication or computing device located outside the building.

7 Claims, 7 Drawing Sheets

FIBER OPTIC CABLE CONFIGURED FOR INDOOR AND OUTDOOR DEPLOYMENT

CROSS REFERENCE TO RELATED APPLICATIONS

The present patent application claims the benefit of priority to the U.S. provisional patent application assigned U.S. Patent Application No. 61/072,611, entitled "Fiber Optic Cable and Method for Fabrication and Installation," and filed Apr. 1, 2008, the entire contents of which are hereby incorporated herein by reference.

TECHNICAL FIELD

The present invention relates generally to fiber optic communications cables and more particularly to a drop cable having two sections, one rated for indoor service and the other rated for outdoor service, wherein a continuous optical fiber extends through both sections.

BACKGROUND

Providing a house, or some other building, with fiber optic service typically entails establishing a fiber optic link from a communication device located outside the house to another communication device inside the house. The outdoor communication device may be a terminal at the curb, a transmission optical fiber located underground, or a box mounted on a pole, for example. The indoor communication device typically includes a transmitter for sending optical signals and a receiver or a detector for converting incoming optical signals into electrical signals.

Conventional approaches to connecting the indoor communication device to the outdoor communication device usually involve two distinct pieces of fiber optic cable, one piece rated for outdoor service and one rated for indoor service. The indoor cable is typically flexible to facilitate snaking the cable through wall, attics, and crawl spaces during installation. Meanwhile, the outdoor cable is typically relatively rigid and may be hardened for burial and/or to withstand environmental exposure. The indoor cable usually has two connectors, one for connecting to the indoor communication device, and one for connecting to the outdoor cable. Similarly, the outdoor cable usually has two connectors, one connecting to the outdoor communication device and one connecting to the indoor cable. Drawbacks of such conventional approaches include expense, labor, optical losses, and reliability issues associated with the connections between the outdoor cable and the indoor cable.

Accordingly, need exists in the art for improved fiber optic cables that can provide robust optical links to support fiber optic access or fiber to the home ("FTTH"). Need further exists for a fiber optic cable that can extend from an outdoor communication device to an indoor communication device via a continuous or unbroken length of optical fiber. Need also exists for a fiber optic cable having one section meeting the particular demands of outdoor service and another section meeting the particular demands of indoor service.

SUMMARY

The present invention supports providing optical communication service, for example via a drop cable.

In one aspect of the present invention, a communications cable can comprise two sections, one rated for outdoor service or deployment, the other rated for indoor service or deployment. A continuous, unbroken, or seamless piece of optical fiber can extend through the cable section rated for outdoor service and the cable section rated for indoor service. The cable section rated for outdoor service can comprise an inner covering and an outer covering, for example two jackets, sheaths, sheathings, or casings. The cable section rated for indoor service can be created via removing the outer covering from a portion of the communications cable.

The discussion of fiber optic communications cables presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
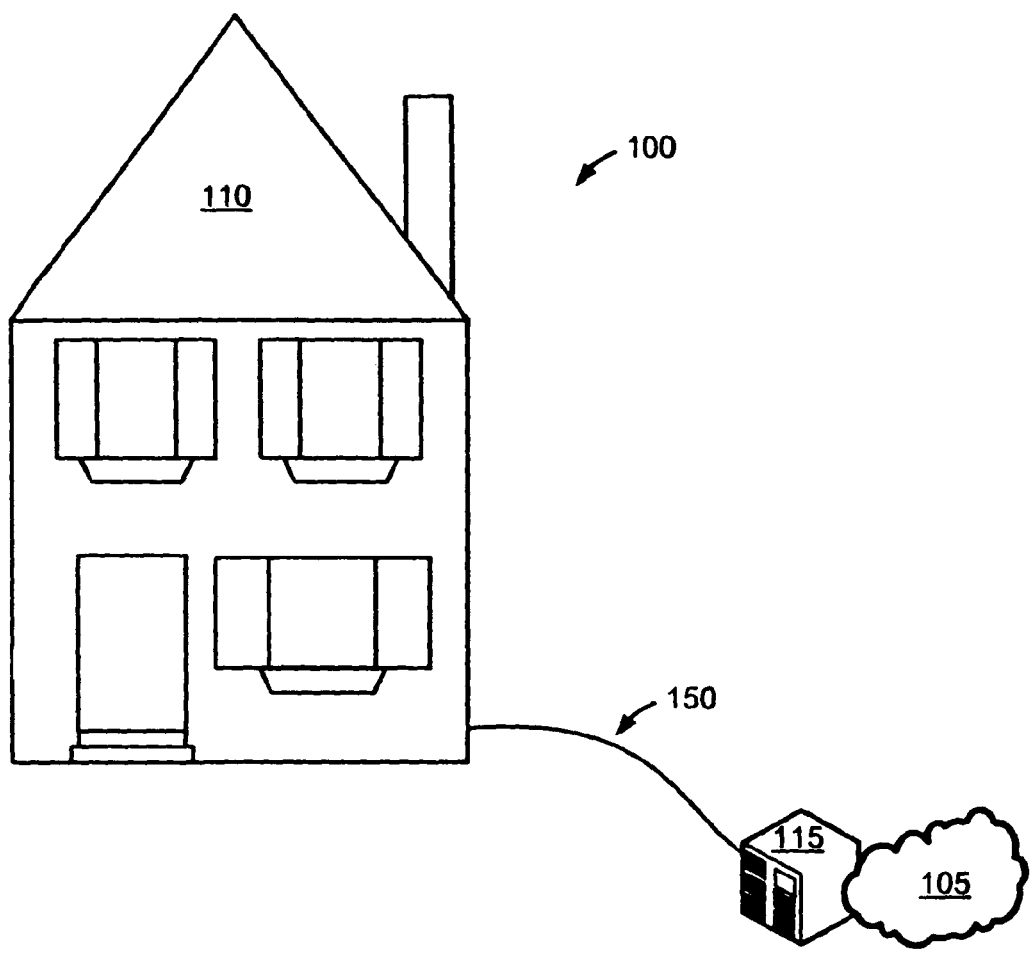
FIG. 1 is an illustration of fiber optic cable providing optical service to a building according to certain exemplary embodiments of the present invention.

Many aspects of the present invention can be better understood with reference to the above drawings. The elements and features shown in the drawings are not to scale, emphasis instead being placed upon clearly illustrating principles of exemplary embodiments of the present invention. Moreover, certain dimensions may be exaggerated to help visually convey those principles. In the drawings, reference numerals designate like or corresponding, but not necessarily identical, elements throughout the several views.

DETAILED DESCRIPTION OF EXEMPLARY EMBODIMENTS

Certain exemplary embodiments of optical communications cables or fiber optic cables and related methods or processes will now be described more fully hereinafter with reference to FIGS. 1-4, which describe representative embodiments of the present invention.

Figure 2:
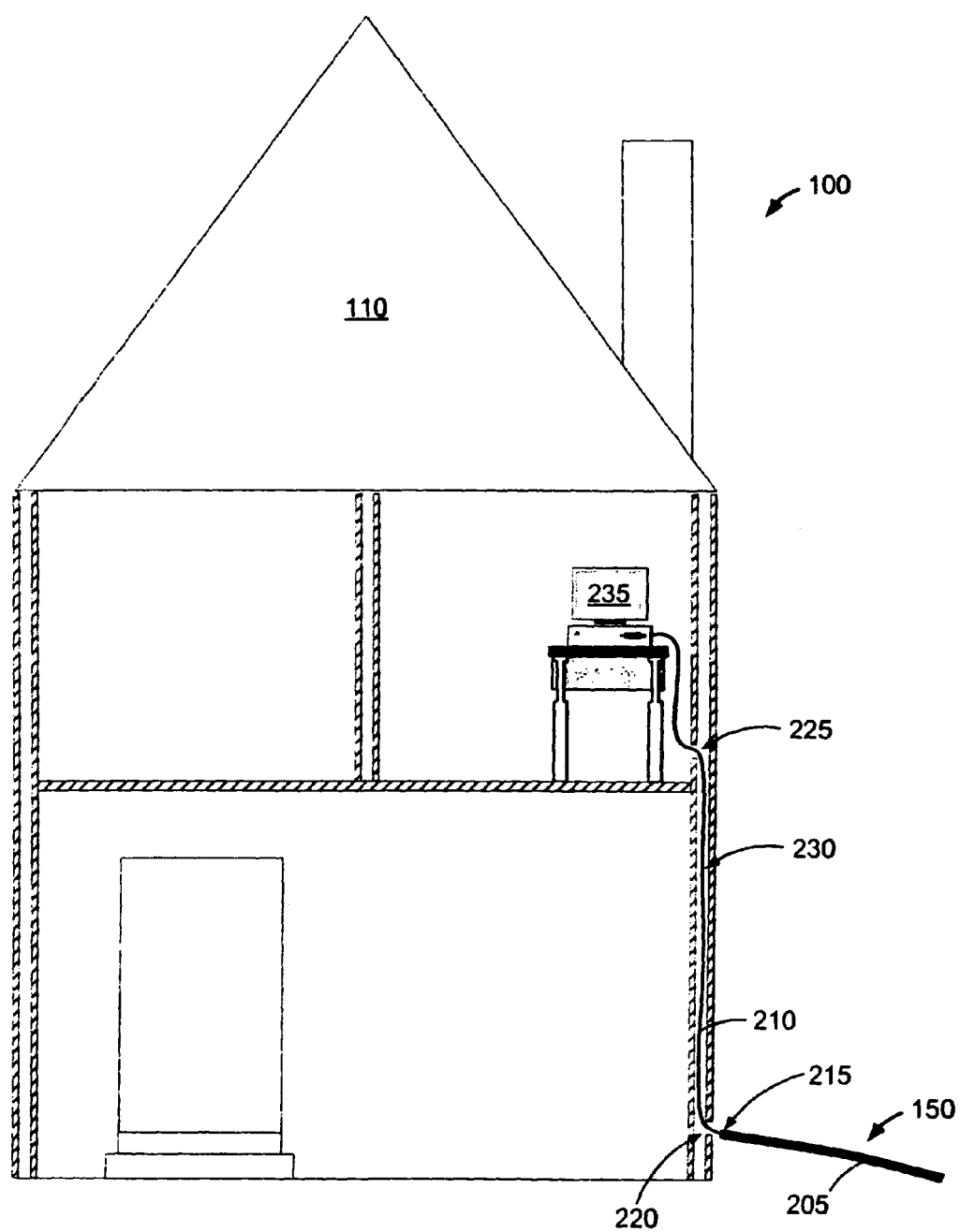
FIG. 2 is cutaway illustration of a building with optical service provided through a fiber optic cable having two sections, one rated for indoor service and one rated for outdoor service according to certain exemplary embodiments of the present invention.

FIGS. 1 and 2 illustrate a representative operating environment or application in which a fiber optic cable provides optical service to a building, such as a dwelling or some other facility or structure that people may occupy. FIGS. 3A, 3B, 3C, 3D, and 3E (collectively FIG. 3) illustrate the fiber optic cable. FIG. 4 illustrates a process for making and installing the fiber optic cable.

The invention can be embodied in many different forms and should not be construed as limited to the embodiments set forth herein: rather, these embodiments are provided so this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates an exemplary fiber optic cable 150 providing optical service to a building 110 in accordance with certain embodiments of the present invention. In the system 100 that FIG. 1 illustrates, the fiber optic cable 150 provides optical connectivity between the outdoor communication device 115 and the building 110. In various exemplary embodiments, the building 110 can comprise a home, a house, a dwelling, a facility, a structure with a roof, a walled structure, a structure that two or more people can occupy, an office complex, an apartment complex, etc.

In various exemplary embodiments, the outdoor communication device 115 can comprise an optical networking hub, a terminal, a connection to a FTTH feed network, a fiber optic coupler, a transmitter, an optical transmitter, a distribution system, a passive optical network ("PON") connection, an underground enclosure, pole-mounted or aerial gear, a roof-mounted device, a curb-side enclosure, a neighborhood aggregation site, a splitter, or an active or passive optical system (not an exhaustive list). The term "optical transmitter," as used herein, generally refers to any device that emits optical signals. Such optical signals can comprise analog modulated light or digitally modulated light and may convey either digital information or analog information.

The outdoor communication device 115 typically provides an interface with an optical network 105 that feeds other buildings (not illustrated). The outdoor communication device 115 can further provide a demarcation point between the optical network 105 and user networking elements. In various exemplary embodiments, the optical network 105 can comprise a connection to the Internet, a cable television network, a connection to the public switched telephone network ("PSTN"), a PON, an access network, a fiber optic ring, a FTTH system, a fiber to the premises ("FTTP") system, a wide area network ("WAN"), an Internet protocol ("IP") network, a distributed computing network, or some other appropriate optical communication system or network, for example. It will be appreciated that the optical network 105, the outdoor communication device 115, and the fiber optic cable 150 can all be elements of a broader optical network for the system 100.

In certain exemplary embodiments, the outdoor communication device 115 has a temperature that fluctuates substantially according to environmental conditions. Thus, the temperature of the devices within the enclosure or the housing of the outdoor communication device 115 may vary seasonally and between day and night. Such devices within the outdoor communication device 115 can comprise a connector at the end of the fiber optic cable 150, for example (see FIG. 3E discussed below). In various exemplary embodiments, temperature fluctuations can swing in a range of temperatures. Such a range can span 10, 25, 40, 50, 55, 60, 65, 70, 75, 80, 85, 110, or 120 degrees Centigrade ("° C."), for example. In one exemplary embodiment, the temperature may vary between −40° C. and 70° C. In one exemplary embodiment, the temperature may vary between −50° C. and 70° C. Accordingly, the exposed portion of the fiber optic cable 150 and the connector can be designed, manufactured, and/or rated to accommodate one, two or more, or all of the aforementioned temperature conditions. For example, the portion of the fiber optic cable 150 located outside the building 110 (see FIGS. 2 and 3) can be rated to withstand −40 to 70° C. or −50 to 70° C. Further, the exposed portion of the fiber optic cable 150 and the connector can meet or comply with the specification known in the industry as "Bellcore GR-20."

In certain exemplary embodiments, the outdoor communication device 115 comprises passive temperature regulation, for example via heat sinks or fins. In certain exemplary embodiments, the outdoor communication device 115 may comprise fans or other powered devices that promote or enhance airflow. In certain exemplary embodiments, the outdoor communication device 115 may comprise one or more air conditioners, heat pumps, or thermal electric coolers for active cooling or active heat removal. In certain exemplary embodiments, the outdoor communication device 115 has no passive or active temperature regulation.

In certain exemplary embodiments, the outdoor communication device 115 comprises a housing that allows at least some moisture, water, or humidity penetration. Thus, components of the outdoor communication device 115 can be subject to fluctuations or changes in humidity that are substantial or substantive, for example. In certain exemplary embodiments, components within the outdoor communication device's housing may be subject to at least some water in the liquid phase, for example via rain spatter, if not via direct contact with rain. Such components can include a connector at the end of the fiber optic cable 150, for example.

Turning now to FIG. 2, this figure illustrates, in cutaway, a building 110 with optical service provided through an exemplary fiber optic cable 150 having two sections 205, 210, one 210 rated for indoor service and one 205 rated for outdoor service in accordance with certain embodiments of the present invention. Thus, the fiber optic cable 150 comprises the indoor-rated section 210 and the outdoor-rated section 205. In an exemplary embodiment, the indoor-rated section 210 is better suited to indoor deployment than the outdoor-rated section 205, while the outdoor-rated section 205 is better suited to outdoor deployment than the indoor-rated section 210. In certain exemplary embodiments, the outdoor-rated section 205 can lack compatibility with indoor deployment, while the indoor-rated section 210 can lack compatibility with outdoor deployment. The system 100 illustrated in FIG. 2 can be an exemplary embodiment of the system 100 illustrated in FIG. 1 and discussed above, and thus will be generally described in that context.

The building 110 comprises an entrance 220 through which the fiber optic communications cable 150 extends. The entrance 220 can comprise a hole, a passage, an aperture, a conduit, a raceway, a vent, a port, or some other appropriate facility for gaining entrance to the building 110. While illustrated slightly above ground level, the entrance 220 can be located in or at a roof, an awning, a floor, a wall, through cement, etc.

As will be discussed in further detail below, the fiber optic cable 150 comprises a transition 215 between the indoor-rated section 210 and the outdoor-rated section 205. In the illustrated exemplary embodiment, the transition 215 is disposed at, or adjacent to, the entrance 220. In various circumstances, the transition 215 can be located inside the building 110 or outside the building 110, for example nearby the entrance 220.

The indoor-rated section 210 snakes though the wall space 230 and emerges through the hole 225 for connection with a communication or computing device 235 within the building 110. The indoor-rated section 210 typically is more flexible than the outdoor-rated section to support feeding the indoor-rated section 210 through narrow or sinuous paths within the building 110. Such paths can comprise, the wall space 230, attics, conduits, raceways, ducts, under-carpet areas, closets, basements, tunnels, etc. The communication or computing device 235 typically comprises an optical receiver, an optical transmitter, or both and optical receiver and an optical transmitter.

The term "optical receiver," as used herein, generally refers to a device that converts optical signals to electrical signals. In other words, optical receivers typically output electrical signals in response to receiving optical signals, wherein the optical signals and the electrical signals usually have at least some common information content. Accordingly, optical receivers usually comprise optical detectors.

In various exemplary embodiments, the communication or computing device 235 can comprise a router, a hub, a local area network ("LAN") site, a television ("TV"), a home computer, a personal computer ("PC"), a media center, a gaming center, a workstation, etc.

Figure 3A:
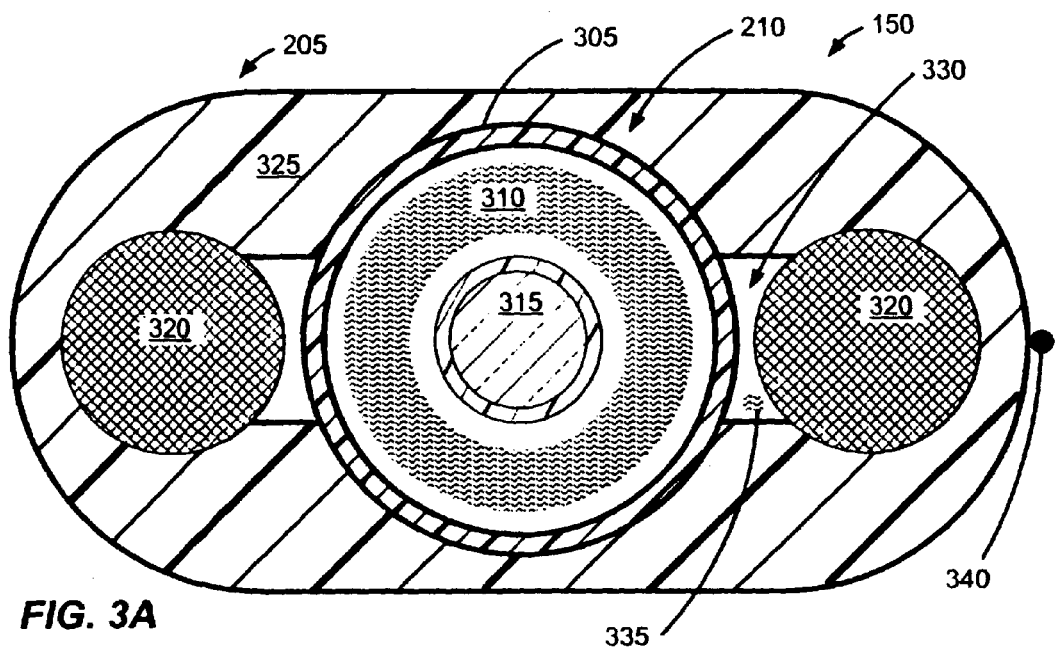
FIG. 3A is a cross sectional illustration of a fiber optic cable comprising an indoor-rated cable located inside an outdoor-rated cable according to certain exemplary embodiments of the present invention.
Figure 4:
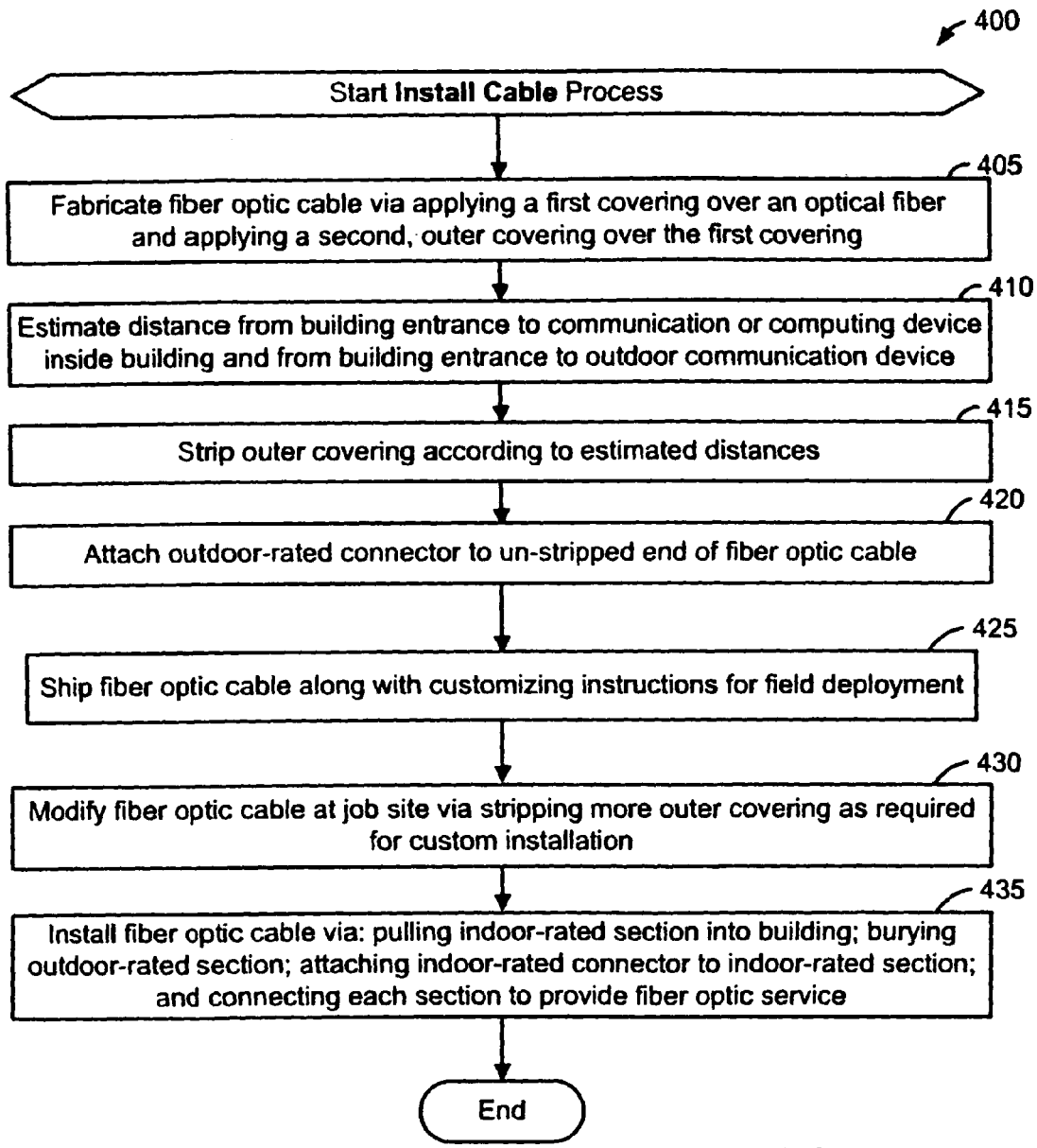
FIG. 4 is a flowchart of a process for making and installing a fiber optic cable according to certain exemplary embodiments of the present invention.

Turning now to FIG. 3A, this figure illustrates, in cross sectional view, an exemplary fiber optic cable 150 comprising an indoor-rated cable located inside an outdoor-rated cable in accordance with certain embodiments of the present invention. FIG. 3A illustrates a cross sectional view of the outdoor-rated section 205. Also, FIG. 3A illustrates a cross sectional view of cable stock that can be processed, as discussed below, to provide the indoor-rated section 210.

In the illustrated cross section, the core of the fiber optic cable 150 comprises a simplex fiber optic cable that serves as the indoor-rated section 210. The term "simplex fiber optic cable," as used herein, refers to a communication cable comprising a single optical fiber.

The indoor-rated section 210 (the simplex component) has a tight-buffer simplex drop cable design and is water-blocked, black jacketed, and riser-rated. In certain exemplary embodiments, the indoor-rated section 210 has a neutral or subtle color, such as ivory or beige, to facilitate matching or blending in with a home decor. The optical fiber 315 is a single-mode optical fiber that can withstand stapling of the indoor-rated section 210 in connection with installation. In other words, the optical fiber 315 is "bend insensitive" or bend tolerant." In an exemplary embodiment, the optical fiber 315 transmits optical signals having a wavelength between about 800 nanometers and 1625 nanometers. Other embodiments may transmit optical signals in other wavelength regions. Suitable sources for the optical fiber 315 include the fiber optic product marketed by OFS/Furukawa Electric North America (Norcross, Ga.) under the trade identifier ALL-WAVE FLEX and the fiber optic product marketed by Draka Cableteq under the trade identifier BENDBRIGHT$^{XS}$.

In various embodiments, the optical fiber 315 can comprise a multimode optical fiber, a plastic optical fiber, a gradient index optical fiber, or some other appropriate waveguide for conveying light. The term "optical fiber," as used herein, generally refers to a slender piece of material that guides light for transmission along a longitudinal axis. The slender piece of material may comprise a filament of glass, plastic, and/or some other appropriately transparent material.

The indoor-rated section 210 comprises a water-blocking material 310 that swells upon contact with water to prevent or to control water-based damage to the optical fiber 315. In one exemplary embodiment, the water-blocking material 310 comprises one, two, three, or four aramid yarns treated with super absorbent polymer material. The water-blocking can comprise yarns marketed by Teijin Aramid under the trade identifier TWARON, and specifically the product that company markets under the product identifiers 1052, 1610, and 2200. The fiber optic cable 150 further comprises a water-blocking thread 335 located outside the indoor-rated section 210, specifically in the air gap 330. The product marketed by Fiber-Line, Inc. of Hatfield, Pa. under the product identifier "FL-P250" is suitable for the water-blocking thread 335. Various water-blocking threads, yarns, and materials (including the aramid yarns discussed above) can be inserted in the air gap 330 for controlling water migration along the fiber optic cable 150.

The indoor-rated section 210 comprises a covering 305 of polymeric material having an outer diameter of about 2.9 millimeters ("mm"). Alternatively, the outer diameter can be about 2.0 mm, about 1.65 mm, or about 2.05 mm. In an exemplary embodiment, the covering 305 (which provides a sheath or jacket for the indoor-rated section 210) comprises a flame retardant material, such as flame retardant polyvinyl chloride ("PVC"), to facilitate a fire resistant rating. The indoor-rated section 210 can be plenum-rated, riser-rated, or considered as a premises cable. Further, the indoor rated section 210 can be flame resistant, fire resistant, or fire retardant, so as to comply with applicable building and fire safety codes for the building 110 or some other operating environment, for example.

In various embodiments, the covering 305 can be extruded or pultruded and can be formed of plastic, rubber, PVC, polymer, polyolefin, flame retardant polyolefin, polyethylene, modified ethylene-CTFE (under the trademark VATAR), PVDF copolymer or homopolymer, acrylic, polyamide (nylon), silicone, urethane, EVA, a halogen-free polymer, or another appropriate material, for example.

Two glass reinforced plastic ("GRP") rods 320 are respectively disposed on opposite sides of the indoor-rated section 210. The GRP rods 320 provide rigidity and crush resistance to facilitate burial of the outdoor-rated section 205 and overall toughness. Further, the GRP rods 320 provide high resistance to pulling forces that may be encountered during installation. For example, the GRP rods 320 can help the outdoor rated section 210 withstand in excess of 300 pounds of pulling force and sustained forces of over 90 pounds that may remain after cable installation. The GRP rods 320 are typically treated with water-swellable or water-blocking material. Each of the GRP rods 320 may have an outer diameter of about 1.65 mm or about 2.05 mm, for example.

The illustrated portion of the fiber optic cable 150 comprises an outer covering 325 of extruded polymer material. In an exemplary embodiment, the outer covering 325 comprises (or consists of) black medium density polyethylene ("MDPE"). The black covering can enhance environmental protection, for example via avoiding damage from ultraviolet sunlight. In an exemplary embodiment, the outer dimensions of the fiber optic cable 150 are about 7.92 mm by 4.15 mm. In certain exemplary embodiments, the outer covering 325, which can be a jacket, a sheath, or a sheathing, is made of PVC, for example utilizing stock polymer supplied by Alphagary Corporation of Leominister, Mass.; Teknor Apex Company of Pawtucket, R.I.; or Polyone Corporation of Avon Lake, Ohio.

In various embodiments, the outer covering 325 can be extruded or pultruded and can be formed of plastic, rubber, PVC, polymer, polyolefin, flame retardant polyolefin, polyethylene, modified ethylene-CTFE (under the trademark VATAR), PVDF copolymer or homopolymer, acrylic, polyamide (nylon), silicone, urethane, EVA, a halogen-free polymer, or another appropriate material, for example.

The fiber optic cable 150 is locatable when buried underground via an insulated copper wire 340 that is remotely locatable. In other words, the copper wire 340 is "toneable" when the outdoor section 205 is buried.

In certain exemplary embodiments, the fiber optic cable 150 is suited for aerial deployment, for example spanning between poles. For example, the fiber optic cable 150 can have a "figure-8" design. That is, the cross section of the fiber optic cable 150 can resemble a FIG. 8 with a strength member that supports aerial installation in one loop of the 8 and the optical fiber 315 in the other loop. Often, one loop of the 8 will be significantly larger in cross section than the other loop.

Figure 3B:
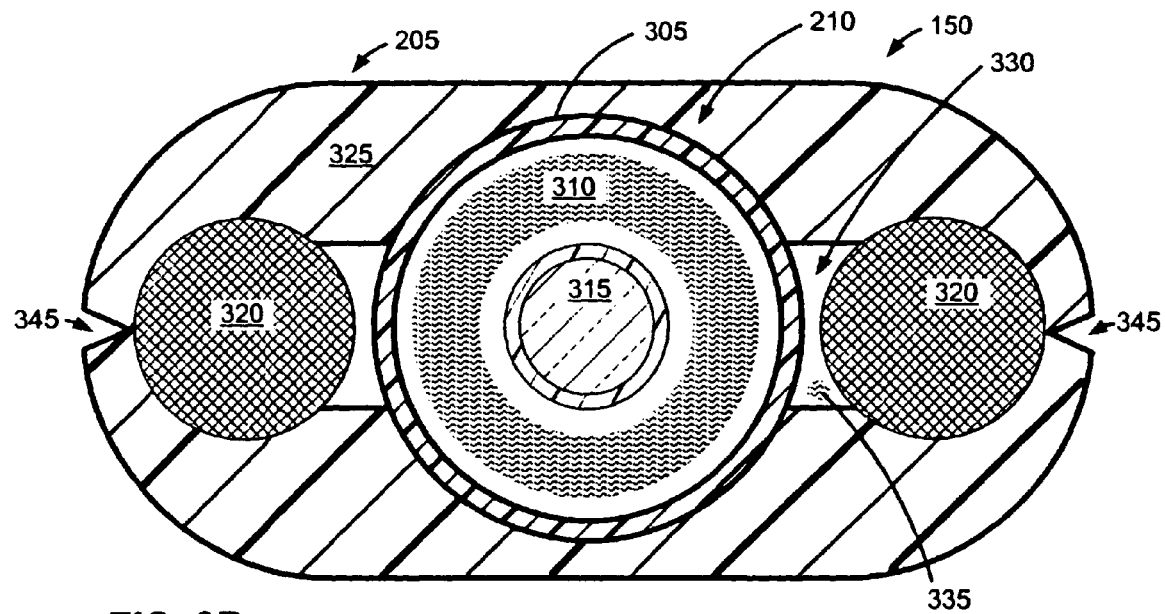
FIG. 3B is a cross sectional illustration of a fiber optic cable comprising an indoor-rated cable located inside an outdoor-rated cable, wherein an outer covering has been slit in preparation for removal to expose the indoor-rated cable, according to certain exemplary embodiments of the present invention.

Turning now to FIG. 3B, this figure illustrates, in side view, an exemplary fiber optic cable 150 comprising an indoor-rated cable located inside an outdoor-rated cable, wherein an outer covering 325 has been slit in preparation for removal to expose the indoor-rated cable, in accordance with certain embodiments of the present invention. The tool marketed by Platinum Tools of Moorpark, Calif. under the trade identifier "EZ FIBER SLITTER" can be used to remove the outer covering.

Figure 3C:
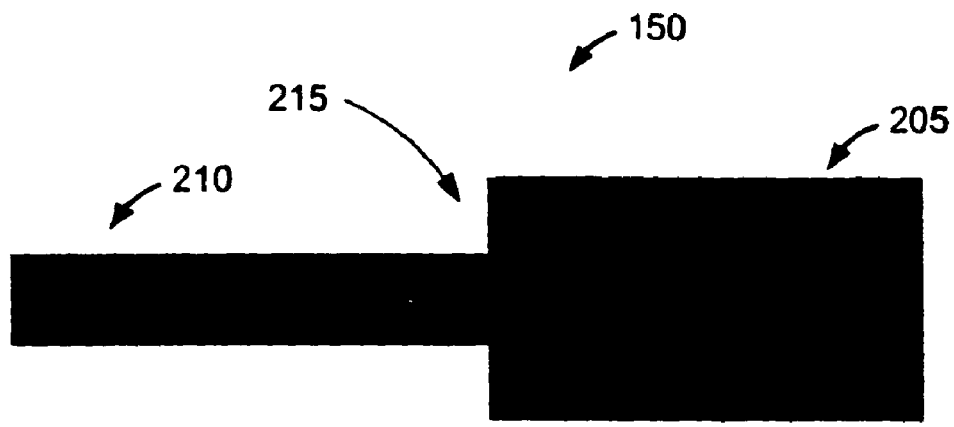
FIG. 3C is a side illustration of a fiber optic cable comprising a section rated for indoor service and another section rated for outdoor service according to certain exemplary embodiments of the present invention.

After pulling the insulated copper wire 340 back, inserting the fiber optic cable 150 in that tool and sliding the cable 150 through the tool creates two slits 345 in the outer covering 325 as illustrated in FIG. 3B. The outer covering 325 can then be peeled back, as if one was peeling a banana. The peeled back section is then clipped off to an appropriate length, along with the GRP rods 320, the water blocking thread 335, and the insulated copper wire 340. FIG. 3C illustrates the results.

More generally, FIG. 3C illustrates, in side view, an exemplary fiber optic cable 150 comprising a section 210 rated for indoor service and another section 205 rated for outdoor service in accordance with certain embodiments of the present invention. The indoor-rated section 210 is the length from which the outer covering 325 has been stripped and from which the GRP rods 320, the water blocking thread 335, and the insulated copper wire 340 have been removed. As discussed above, the transition 215 is the location at which the fiber optic cable transitions from being rated for outdoor service to being rated for indoor service. In many cases, the insulated copper wire 340 extends past the transition 215 to facilitate connecting the copper wire 340 to a ground connection, such as a grounding post.

A "P clamp" can grasp the GRP rods 320 to facilitate securing the fiber optic cable 150 to the building 110 adjacent the entrance 220. Thus, a clamp embracing the GRP rods 320 can be fastened to a structure of the building 110, for example with one or more nails or screws.

In certain exemplary embodiments, the GRP rods 320 can extend at the transition 215 one to twelve inches past the end of the outer covering 325 (in the direction of the indoor rated section). That is, the GRP rods 320 can protrude from the transition 215.

Figure 3D:
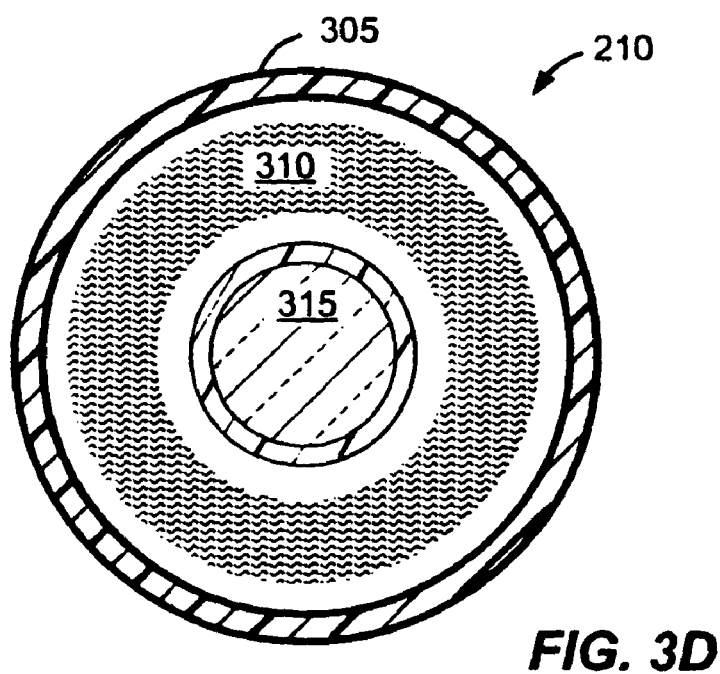
FIG. 3D is a cross sectional illustration of a section of fiber optic cable rated for indoor service according to certain exemplary embodiments of the present invention.

FIG. 3D illustrates in cross section the indoor rated section 210. More generally, FIG. 3D illustrates, in cross sectional view, a section 210 of an exemplary fiber optic cable rated for indoor service in accordance with certain embodiments of the present invention.

Figure 3E:
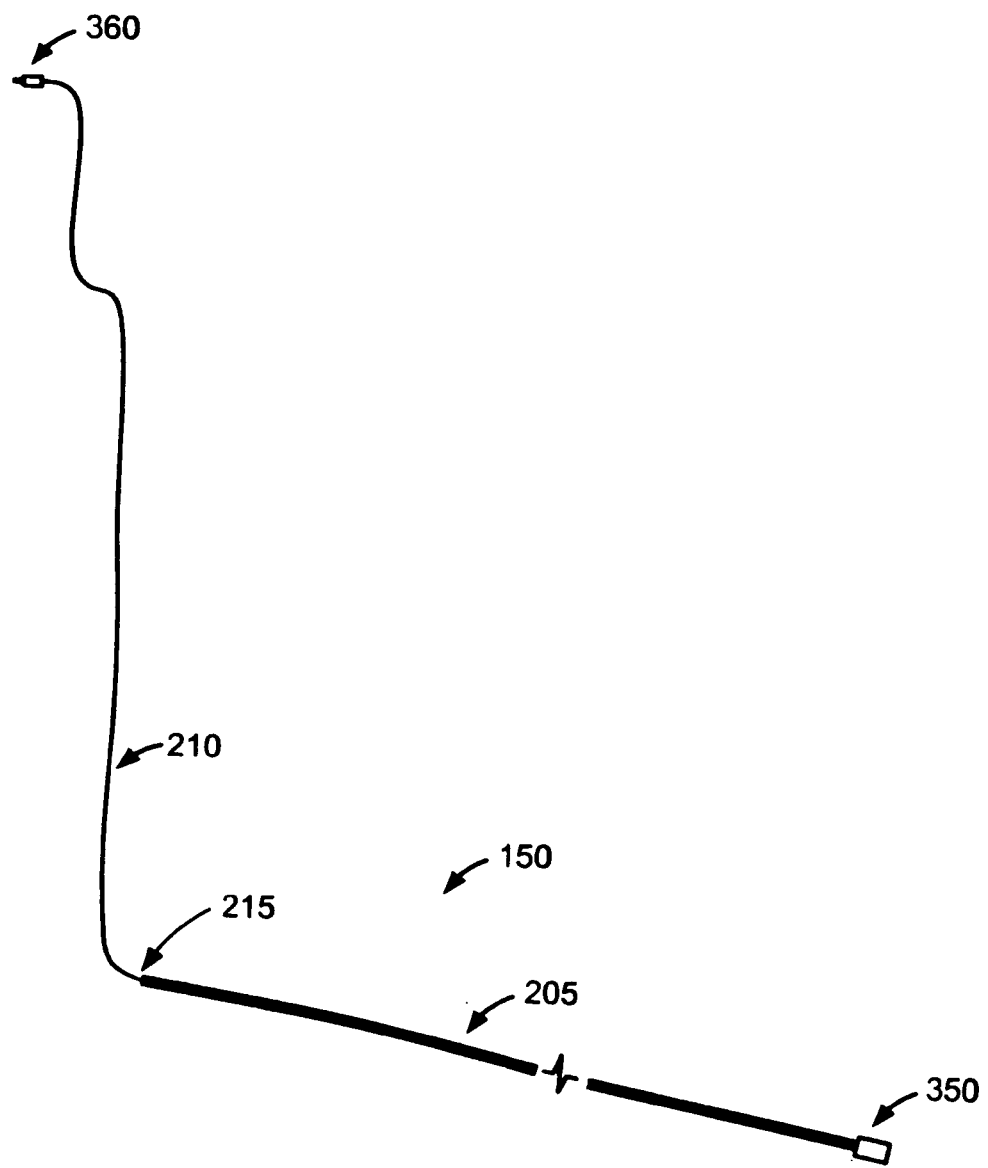
FIG. 3E is an illustration of a fiber optic cable comprising a section rated for indoor service and another section rated for outdoor service according to certain exemplary embodiments of the present invention.

Turning now to FIG. 3E, this figure illustrates an exemplary fiber optic cable 150 comprising a section 210 rated for indoor service and another section 205 rated for outdoor service in accordance with certain embodiments of the present invention. FIG. 3E further illustrates the connector 360 rated for indoor use and the connector 350 rated for outdoor use. Thus, as compared to the indoor-rated connector 360, the outdoor-rated connector 350 typically can withstand harsher or more extreme environmental conditions, for example associated with greater swings in temperature, humidity, contamination, etc. as discussed above. In an exemplary embodiment, the outdoor-rated connector 350 can be a connector supplied by Corning Cable Systems LLC under the trade identifier OPTITAP. In certain exemplary embodiments, the indoor-rated connector 360 can be a pre-polished connector that is fusion-spliced to the optical fiber 315. Exemplary connectors for the indoor-rated connector 360 are available from Sumitomo Electric Lighwave in Research Triangle Park, N.C. and from Furukawa America, Inc. in Peachtree City, Ga. under the trade identifier FITEL.

Turning now to FIG. 4, this figure illustrates a flowchart of an exemplary process 400 for making and installing a fiber optic cable 150 in accordance with certain embodiments of the present invention.

Certain steps in the process(es) described below (and elsewhere herein) must naturally precede others for the present invention to function as described. However, the present invention is not limited to the order of the steps described if such order or sequence does not adversely alter the functionality of the present invention. That is, it is recognized that some steps may be performed before or after other steps or in parallel with other steps without departing from the scope and spirit of the present invention.

At step 405 of process 400, which is entitled "Install Cable," the fiber optic cable 150 is fabricated as discussed above. Fabrication typically comprises applying the covering 305 and the outer covering 325 over the optical fiber 315.

At step 410, distances are estimated from the building entrance 220 to the communication or computing device 235 within the building 110 and from the building entrance 220 to the outdoor communication device 115. In an exemplary embodiment, these distance are based on industry averages or residential statistics. An assortment of versions of the fiber optic cable 150, each with a different part number, can be fabricated with different lengths and dimensions, for example.

At step 415, the fiber optic cable 150 is cut to length and the outer covering 325 is stripped according to the distance estimates. The GRP rods 320, the copper wire 340, and the water-blocking thread 335 are shortened according to the distance estimates, thus providing the indoor-rated section 210 and the outdoor-rated section 205 as discussed above.

At step 420, the outdoor-rated connector 350, which is typically hardened, is attached to the outdoor-rated section 205, while the indoor-rated section 210 ends without an attached connector. In some applications, a connector that is not outdoor-rated can be substituted for the outdoor-rated connector 350. As an alternative to leaving the indoor-rated section bare, the fiber optic cable 150 can be fully connectorized at step 420, with an indoor-rated connector 360 on the indoor-rated section 210 and an outdoor-rated connector 350 on the outdoor-rated section 205.

Figure 5:
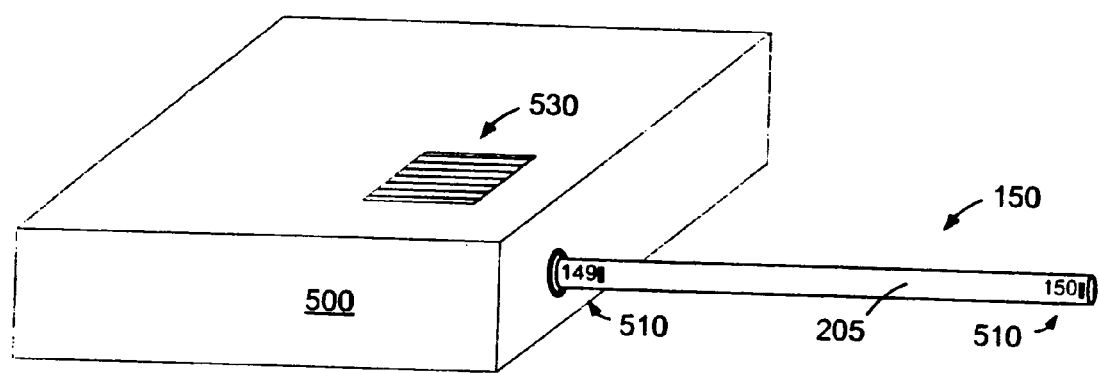
FIG. 5 is an illustration of a packaged fiber optic cable according to certain exemplary embodiments of the present invention.

At step 425, the resulting fiber optic cable 150 is shipped (typically as a roll, coil, or reel) from manufacturing to a job site, a customer location, or a warehouse, for example. As shown in the exemplary embodiment of FIG. 5, the coiled fiber optic cable 150 can be placed in a box 500 with the indoor-rated section 210 protruding from a hole. Length markings 510 on the indoor-rated section 210 can decrement or decrease numerically so as to provide installers with an indication of the amount of the fiber optic cable 150 that remains in the box 500 as the fiber optic cable 150 is pulled out of the box 500. For example, the length markings 510 can comprise a footage countdown. The fiber optic cable 150 is typically shipped with modification instructions 530 on a medium such as paper, computer disk, website, etc. The modification instructions 530 can describe any or all of the disclosure and teaching presented herein about how to make, use, and/or work with the various exemplary embodiments. In one exemplary embodiment, the modification instructions comprise essentially the full text and drawings presented here.

At step 430, the fiber optic cable 150 can be customized at the job site for a specific deployment. Typically, the fiber optic cable 150 includes some excess length. The installers can customize the length of the indoor-rated section 210 via removing additional length of the outer covering, the GRP rods 320, the copper wire 340, and the water-blocking thread 335. For example, the installers can accommodate a building 110 that has a large distance between the entrance 220 and the communication or computing device 235 via lengthening the indoor-rated section 210 (and thus shortening the outdoor-rated section).

At step 435, the installers pull the indoor-rated section 210 into the building (via the entrance 220 for example) and bury the outdoor-rated section 205, for example via direct burial or placement in a conduit. Alternatively, the outdoor-rated section 205 can be suspended aerial, for example between poles. The installers connect the outdoor-rated connector 350 to the outdoor communication device 115. The installers (or a user) attaches the indoor-rated connector 360 to the indoor-rated section 210 and then connect the indoor-rated connector 360 to the communication or computing device 235. Excess length of the indoor-rated section 210 is coiled and stowed inside the building 110, while excess length of the outdoor-rated section 205 can be coiled and stowed either inside or outside.

Process 400 ends following step 435, and the building 110 is provided with optical service.

From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is to be limited only by the claims that follow.

The invention claimed is:

1. A fiber optic cable system comprising:
   a first cable end;
   a second cable end opposite the first cable end;
   a transition located between the first cable end and the second cable end;
   a simplex fiber optic cable rated for indoor service extending seamlessly from the first cable end to the second cable end; and
   a section of fiber optic cable that is rated for outdoor service, that extends from the first cable end to the transition, and that comprises:
      a section of the simplex fiber optic cable rated for indoor service;
      a rigid strength member that extends lengthwise alongside the section of the simplex fiber optic cable and that terminates at the first cable end and at the transition; and
      an outer jacket extending lengthwise, circumferentially surrounding the section of the simplex fiber optic cable and the rigid strength member, and terminating at the first cable end and at the transition.

2. The fiber optic cable system of claim 1, wherein the rigid strength member that terminates at the first cable end and at the transition protrudes about one to twelve inches past the transition, beyond the outer jacket towards the second cable end.

3. The fiber optic cable system of claim 1, wherein distance between the transition and the second cable end has been selected to extend the simplex fiber optic cable that is rated for indoor service into a particular facility towards a receiver disposed in a room of the particular facility.

4. The fiber optic cable system of claim 1, further comprising instructions about:
   extending the simplex fiber optic cable rated for indoor service into a building; and
   extending the section of fiber optic cable that is rated for outdoor service underground and away from the building.

5. The fiber optic cable system of claim 1, further comprising instructions for disposing the section of the simplex fiber optic cable rated for indoor service and the section of fiber optic cable rated for outdoor service so that the transition demarcates between indoors and outdoors, with another section of the simplex fiber optic cable rated for indoor service extending indoors.

6. The fiber optic cable system of claim 1, further comprising instructions for shortening the rigid strength member and the outer jacket to move the transition relative to the first cable end and the second cable end for installation customization.

7. The fiber optic cable system of claim 1, further comprising:
   an outdoor-rated fiber optic connector attached to the first cable end and operable over a temperature range of −50 degrees Centigrade to 70 degrees Centigrade; and
   an indoor-rated fiber optic connector attached to the second cable end.

* * * * *